United States Patent [19]

Suzuki et al.

[11] Patent Number: 5,063,553
[45] Date of Patent: Nov. 5, 1991

[54] CARTRIDGE GUIDING DEVICE FOR DISK PLAYER

[75] Inventors: Shoji Suzuki; Kenji Yatsu, both of Iwaki, Japan

[73] Assignee: Alpine Electronics Inc., Tokyo, Japan

[21] Appl. No.: 568,570

[22] Filed: Aug. 16, 1990

[30] Foreign Application Priority Data

Oct. 4, 1989 [JP] Japan ................... 1-260550

[51] Int. Cl.⁵ ................... G11B 33/02; G11B 17/22
[52] U.S. Cl. ................... 369/77.1; 369/75.1; 369/75.2; 369/77.2; 369/36; 369/38
[58] Field of Search ................... 369/77.1, 77.2, 75.1, 369/75.2, 36, 37, 38, 39; 360/97.03, 98.01, 98.04, 99.02, 99.06

[56] References Cited

U.S. PATENT DOCUMENTS

| | | | |
|---|---|---|---|
| 4,592,039 | 5/1986 | Toyoguchi et al. | 369/75.2 |
| 4,691,309 | 9/1987 | Suzuki | 369/38 |
| 4,701,900 | 10/1987 | Hasegawa et al. | 369/36 |
| 4,707,819 | 11/1987 | Ehara | 369/77.2 |
| 4,722,078 | 1/1988 | Nakanishi et al. | 369/39 |
| 4,737,945 | 4/1988 | Yamazaki et al. | 369/36 |
| 4,786,998 | 11/1988 | Sugawara et al. | 369/77.2 |
| 4,797,865 | 1/1989 | Imai et al. | 369/39 |

FOREIGN PATENT DOCUMENTS

WO89/08918 9/1989 Japan.

Primary Examiner—Stuart S. Levy
Assistant Examiner—Tien Ba Pham
Attorney, Agent, or Firm—Guy W. Shoup; Norman R. Klivans

[57] ABSTRACT

A cartridge guiding device for a disk player which is easy to operate as an audio device for the domestic use. The cartridge guiding device includes a drawing in member provided in a mounting section of the disk player such that it is driven by a driving source to move toward the interior of the mounting section and is engaged, during such movement, with a stepped portion of a disk cartridge mounted on the mounting section to draw in the disk cartridge toward the interior of the mounting section, and a discharging member provided in the mounting section such that it is driven by the driving source to move toward the outside of the mounting section and is engaged, during such movement, with part of a disk cartridge mounted on the mounting section to discharge the disk cartridge from the mounting section.

4 Claims, 6 Drawing Sheets

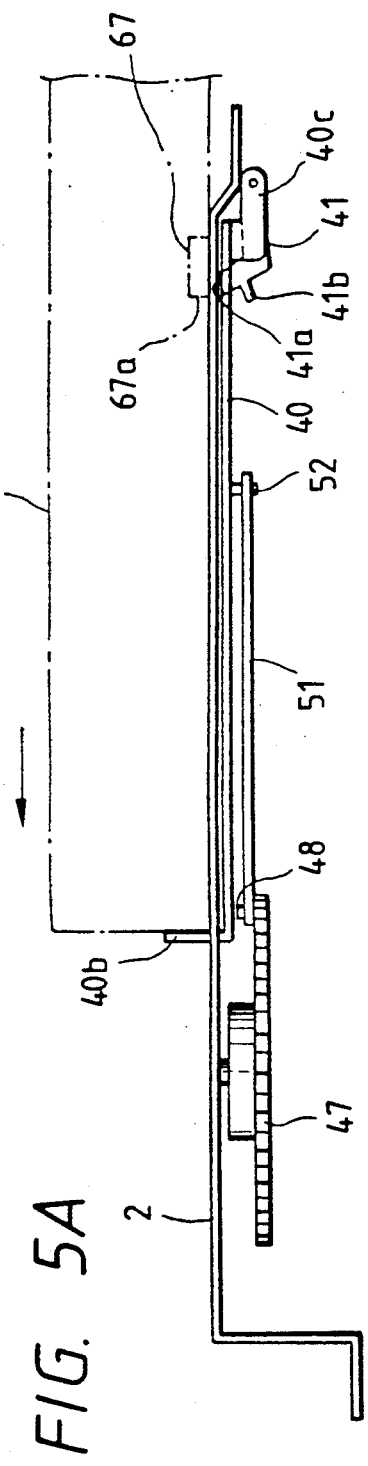
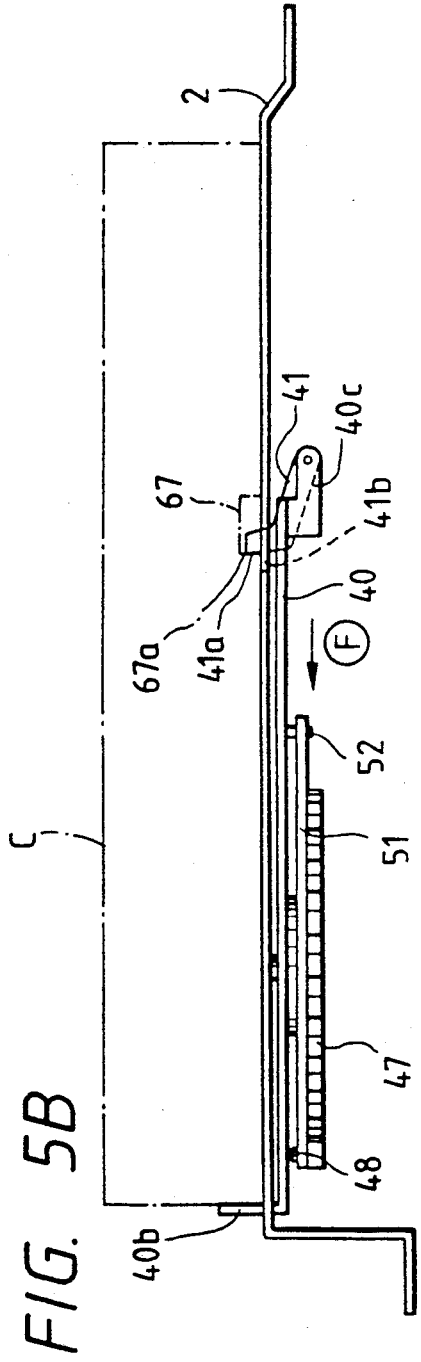

CARTRIDGE GUIDING DEVICE FOR DISK PLAYER

BACKGROUND OF THE INVENTION

1. Field of the Invention

This relates to a disk player having a disk changer in which a disk cartridge in which a plurality of disks are accommodated is loaded, and more particularly to a cartridge guiding device for such disk player which allows automatic insertion and discharging of a disk cartridge into and out of the disk player.

2. Description of the Prior Art

Recently, a compact disk player with a disk changer is introduced with which a disk cartridge in which a plurality of disks are accommodated. In a player of the type mentioned, when a cartridge in which a plurality of disks are accommodated is loaded in position, one of the disks in the cartridge is searched for and drawn out from the cartridge. Then, the disk thus drawn out is guided to a disk driving section at which a reproducing operation of the disk is performed.

Conventional disk players with a disk changer of the type mentioned are principally used in a car. Where a disk player is of the car carried type, it is normally installed in a trunk room or the like of an automobile, and accordingly, it is assumed that, once a disk cartridge is loaded in position into the disk player, it is not exchanged frequently. Accordingly, in a conventional disk player of the type mentioned, a disk cartridge is inserted into the player by manual operation, and only an operation of discharging a cartridge is performed using a driving force, or else the cartridge is discharged by manual operation.

Recently, however, it has been put into consideration to use a disk player with a disk changer for domestic use. Where a disk player with a disk changer is used for domestic use, since an exchanging operation of a disk cartridge takes place frequently comparing with a disk player with a disk changer of the car carried type, handling is very inconvenient with a conventional system wherein a cartridge is loaded in position only by force of the hand. Further, where disk player with the disk changer is constructed such that a disk cartridge is mounted in position only by a force of a hand, the high quality feeling of the audio apparatus is reduced.

SUMMARY OF THE INVENTION

It is an object of the present invention to provide a cartridge guiding device for a disk player which is easy to operate as an audio device for domestic use.

In order to attain the object, according to the present invention, there is provided a cartridge guiding device for a disk player which includes a mounting section onto which a disk cartridge in which a plurality of disks are accommodated is to be mounted, and a disk driving section for driving a disk selectively taken out of a disk cartridge mounted on the mounting section, the cartridge guiding device comprising a drawing-in member provided in the mounting section such that the drawing-in member is driven by a driving source to move toward the interior of the mounting section and is engaged, during such movement, with a stepped portion of a disk cartridge mounted on the mounting section to draw in the disk cartridge toward the interior of the mounting section, and a discharging member provided in the mounting section such that the discharging member is driven by the driving source to move toward the outside of the mounting section and is engaged, during such movement, with part of a disk cartridge mounted on the mounting section to discharge the disk cartridge from the mounting section.

With the cartridge guiding device for a disk player, when a disk cartridge is inserted in position into the mounting section of the disk player, this may be detected by a suitable means and the drawing-in member is driven by the driving source such as a motor in response to such detection signal so that it is moved toward the interior of the mounting section. During such movement of the drawing-in member, it is engaged with the stepped portion which may be provided on a bottom wall or the like of the disk cartridge so that the disk cartridge is thereafter drawn in toward the inside of the mounting section by the drawing-in member until it is mounted in position onto the mounting section. On the other hand, when the disk cartridge is to be discharged, the discharging member is moved toward the outside of the mounting section by the driving force of the motor, and during such movement, it is engaged with an end face or the like of the cartridge to push the cartridge to move outwardly of the mounting section.

In this manner, with the cartridge guiding device, once a disk cartridge is inserted in position into the cartridge mounting section, the cartridge is thereafter loaded automatically in position into the disk driving section of the disk player so that it may be reproduced by the disk driving section. Further, the disk cartridge thus loaded in position can be discharged automatically from the disk player. Accordingly, an operation for exchanging a cartridge can be performed readily, and a high quality feeling as an audio device for domestic use is obtained.

The above and other objects, features and advantages of the present invention will become apparent from the following description and the appended claims, taken in conjunction with the accompanying drawings.

BRIEF DESCRIPTION OF THE DRAWINGS

FIGS. 5A and 5B are side elevational views as viewed in the direction indicated by an arrow mark V in FIG. 3 showing the cartridge table of FIG. 3 at different positions;

DETAILED DESCRIPTION OF THE PREFERRED EMBODIMENTS

Figure 1:
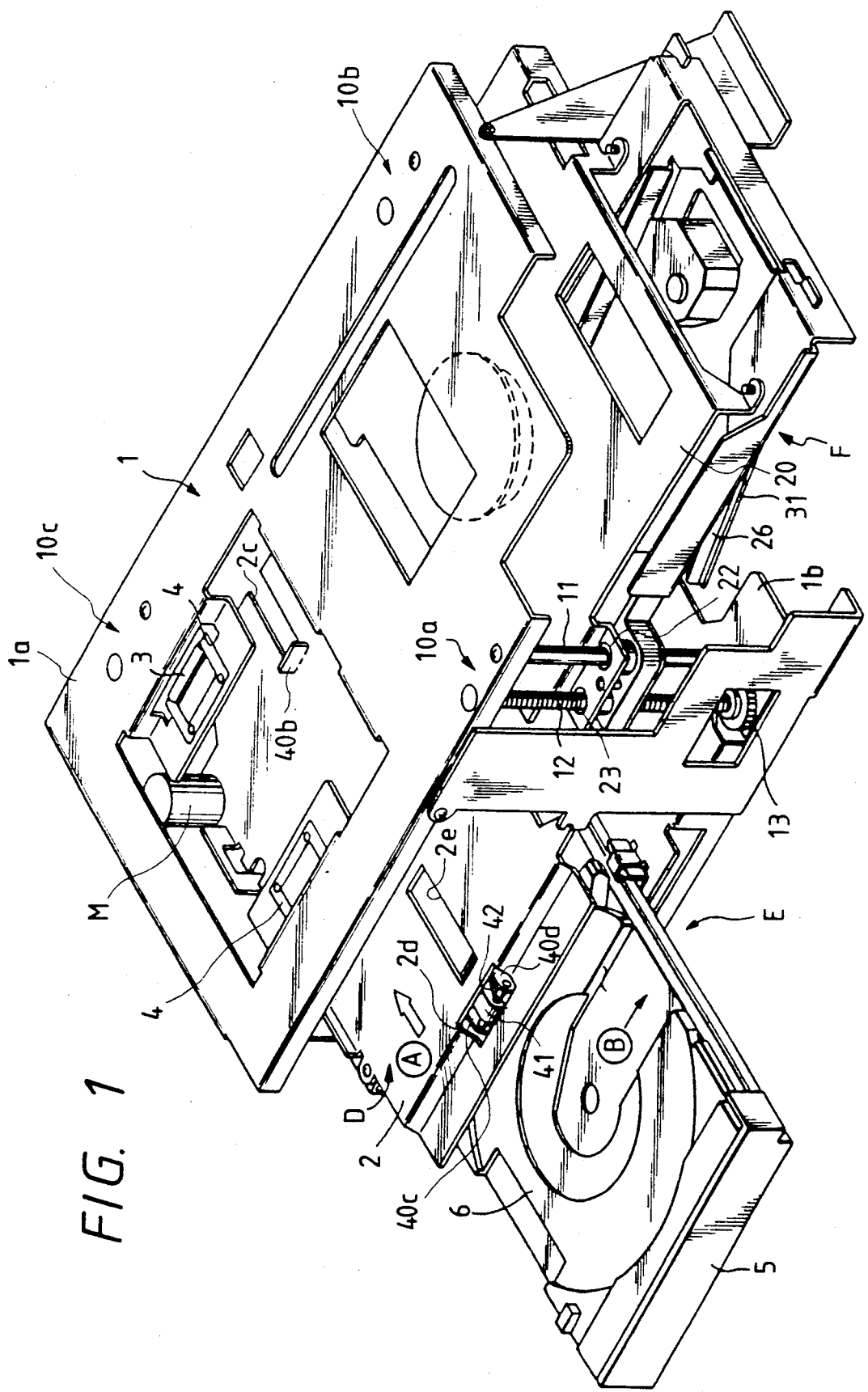
FIG. 1 is a perspective view showing an appearance of a disk player with a disk changer in which a disk guiding device to which the present invention is applied is incorporated.
Figure 2:
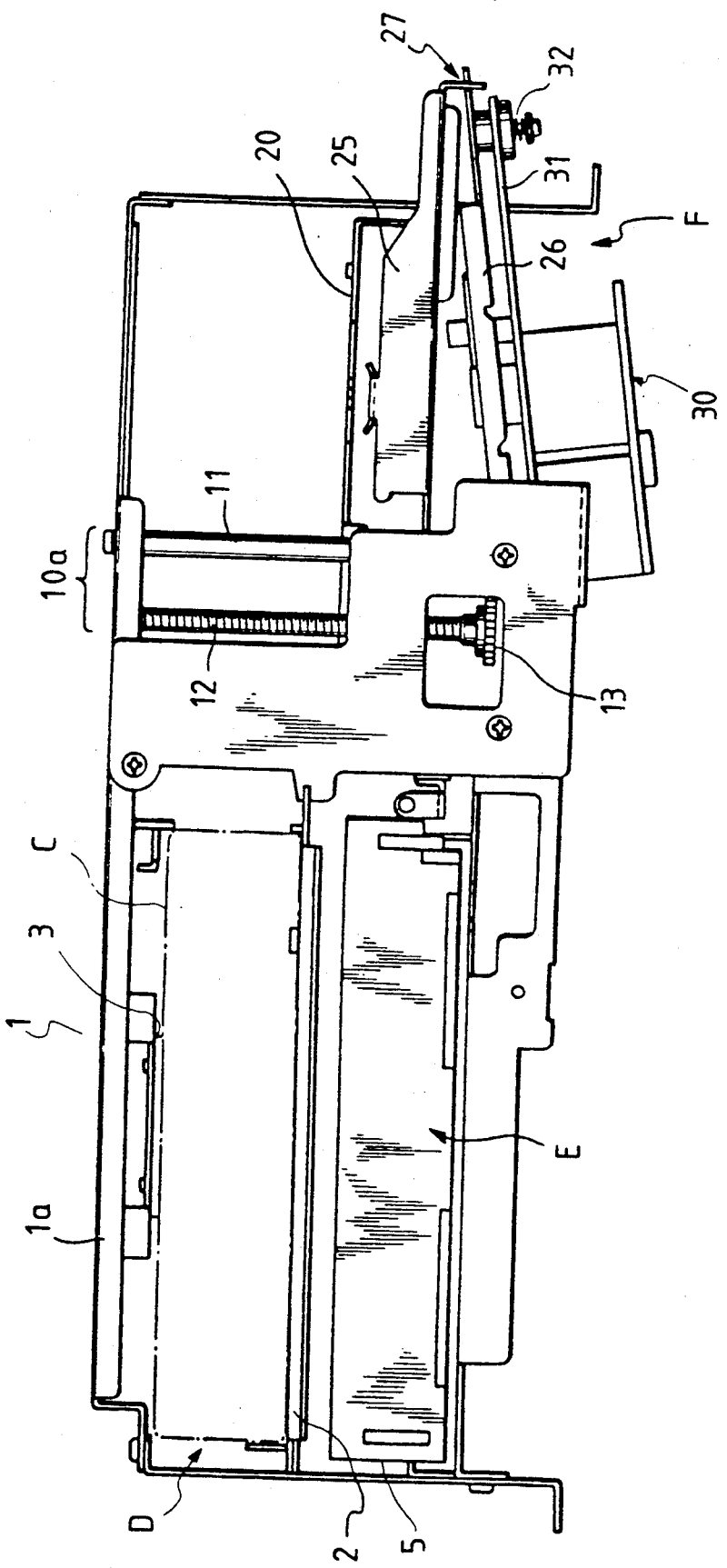
FIG. 2 is a front elevational view of the disk player of FIG. 1.
Figure 6:
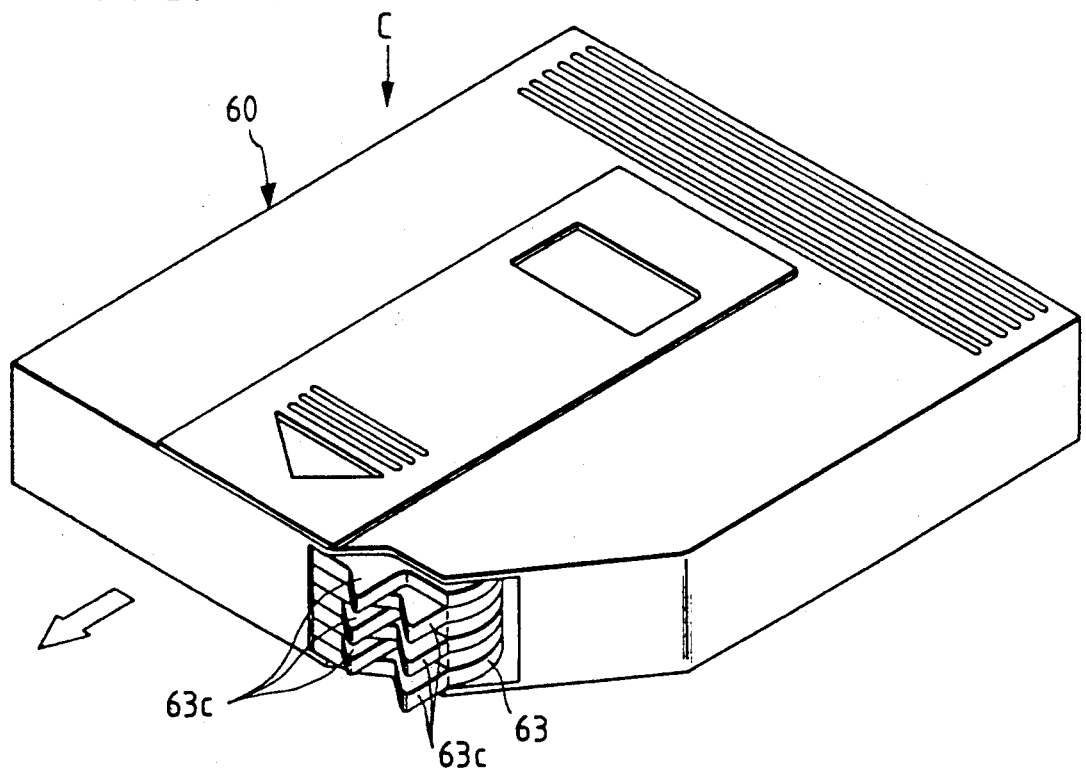
FIG. 6 is a perspective view of a disk cartridge for use with the disk player of FIG. 1.

Referring first to FIGS. 1 and 2, there is shown an entire mechanism of a compact disk player with a disk changer for domestic use. The disk player shown includes a body chassis 1 in which a cartridge mounting section D, a single disk supplying section E and a disk driving section F are arranged. Such a disk cartridge C as shown in FIG. 6 in which a plurality of, 6 in the arrangement shown, compact disks are accommodated is inserted in the direction indicated by an arrow mark Ⓐ forwardly into the cartridge mounting section D. A cartridge table 2 is disposed at a lower portion of the cartridge mounting section D such that a disk cartridge C is mounted in position into the cartridge mounting section D under the guidance of the cartridge table 2. A pair of pressing rollers 3 (only one is shown in FIG. 1) are mounted on a ceiling plate 1a of the body chassis 1. Each of the pressing rollers 3 is normally urged by a leaf spring 4 so that the disk cartridge C mounted in position on the mounting section D is pressed against the cartridge table 2 by the urging forces of the leaf springs 4.

The single disk supplying section E is disposed at a location below the cartridge mounting section D. At the single disk supplying section E, a slide table 5 is advanced into and retracted from the body chassis 1. A disk tray 6 is provided on the slide table 5. The disk tray 6 is constructed such that disks having different diameters such as a compact disk and a single compact disk can be selectively positioned thereon. In a condition wherein the slide table 5 is accommodated in the body chassis 1, the disk tray 6 can be moved in the direction indicated by an arrow mark Ⓑ whereupon a disk is supplied to the disk driving section F together with the disk tray 6.

Meanwhile, three lifting mechanisms 10a, 10b and 10c are provided in the body chassis 1 as shown in FIGS. 1 and 2. Each of the lifting mechanisms 10a, 10b and 10c is composed of a guide shaft 11, a lifting screw 12 and a gear 13 secured to a lower end of the lifting screw 12. The gears 13 of the lifting mechanisms 10a to 10c are driven to rotate in a synchronized relationship by a driving mechanism (not shown) provided on a lower face of a bottom plate 1b of the body chassis 1. The disk driving section F is driven to move in the body chassis 1 by the lifting mechanisms 10a to 10c.

Figure 7:
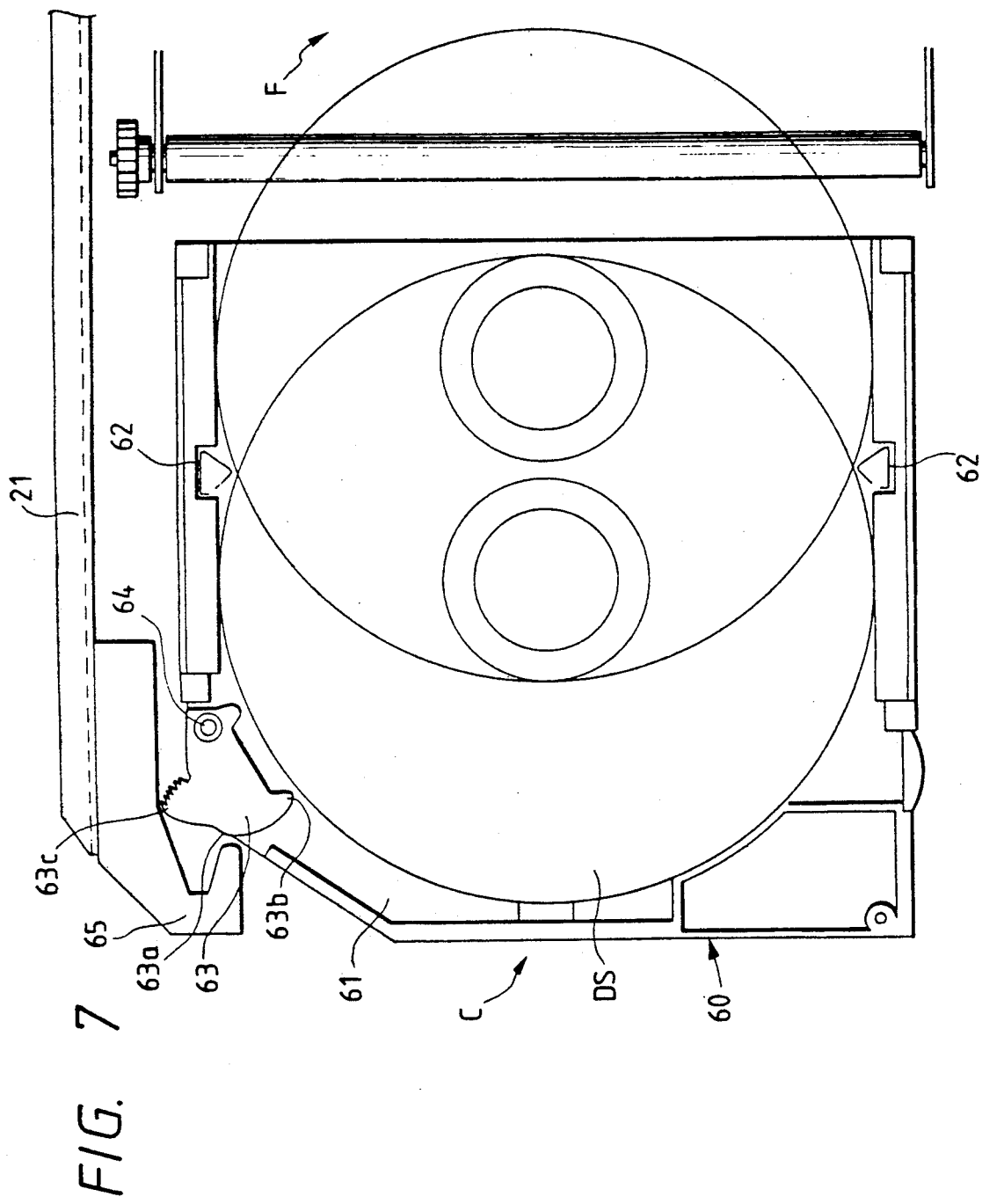
FIG. 7 is a plan view illustrating an operation of discharging a disk from within a cartridge.

As shown in FIGS. 1 and 2, a lift table 20 is located in the disk driving section F. As shown in FIG. 7, a disk drawing-out portion 21 extends linearly on the right-hand side of the lift table 20. The lift table 20 has a guide hole 22 and an adjacent female threaded hole 23 formed at each of the portions thereof corresponding to the lifting mechanisms 10a to 10c. The guide shafts 11 of the lifting mechanisms 10a to 10c are fitted in the guide holes 22 of the lift table 20 while the lifting screws 12 are screwed in the female threaded holes 23. When the three gears 13 are driven in a synchronized relationship by the driving mechanism provided on the lower face of the bottom plate 1b of the body chassis 1 to rotate the lifting screws 12 of the lifting mechanism 10a to 10c in a synchronized relationship, the lift table 20 is driven to move upwardly or downwardly in the body chassis 1. By such upward or downward movement of the lift table 20, it can be positioned to a position corresponding to one of disks accommodated in the disk cartridge C or to another position at which a disk placed on the disk tray 6 can be taken out of the disk tray 6.

Referring to FIG. 2, an intermediate table 25 is provided in a predetermined spaced relationship below the lift table 20 in the disk driving section F. A clamp chassis 26 is disposed below the intermediate table 25. The clamp chassis 26 is held in engagement with the intermediate table 25 such that a rear end (right-hand end in FIG. 2) thereof acts as a fulcrum 27 of pivotal motion of the clamp chassis 26. Thus, the clamp chassis 26 is rocked upwardly or downwardly around the fulcrum 27 with respect to the intermediate table 25. Then, a disk reproducing unit 30 is mounted at a lower portion of the clamp chassis 26. A pickup chassis 31 of the disk reproducing unit 30 is mounted on the clamp chassis 26 by way of a damper supporting mechanism 32. Though not shown, a turntable and a spindle motor for rotating the turntable, an optical pickup having an objective lens and so forth are carried on the pickup chassis 31.

Subsequently, the structure of the cartridge guiding device of the cartridge mounting section D will be described.

Figure 3:
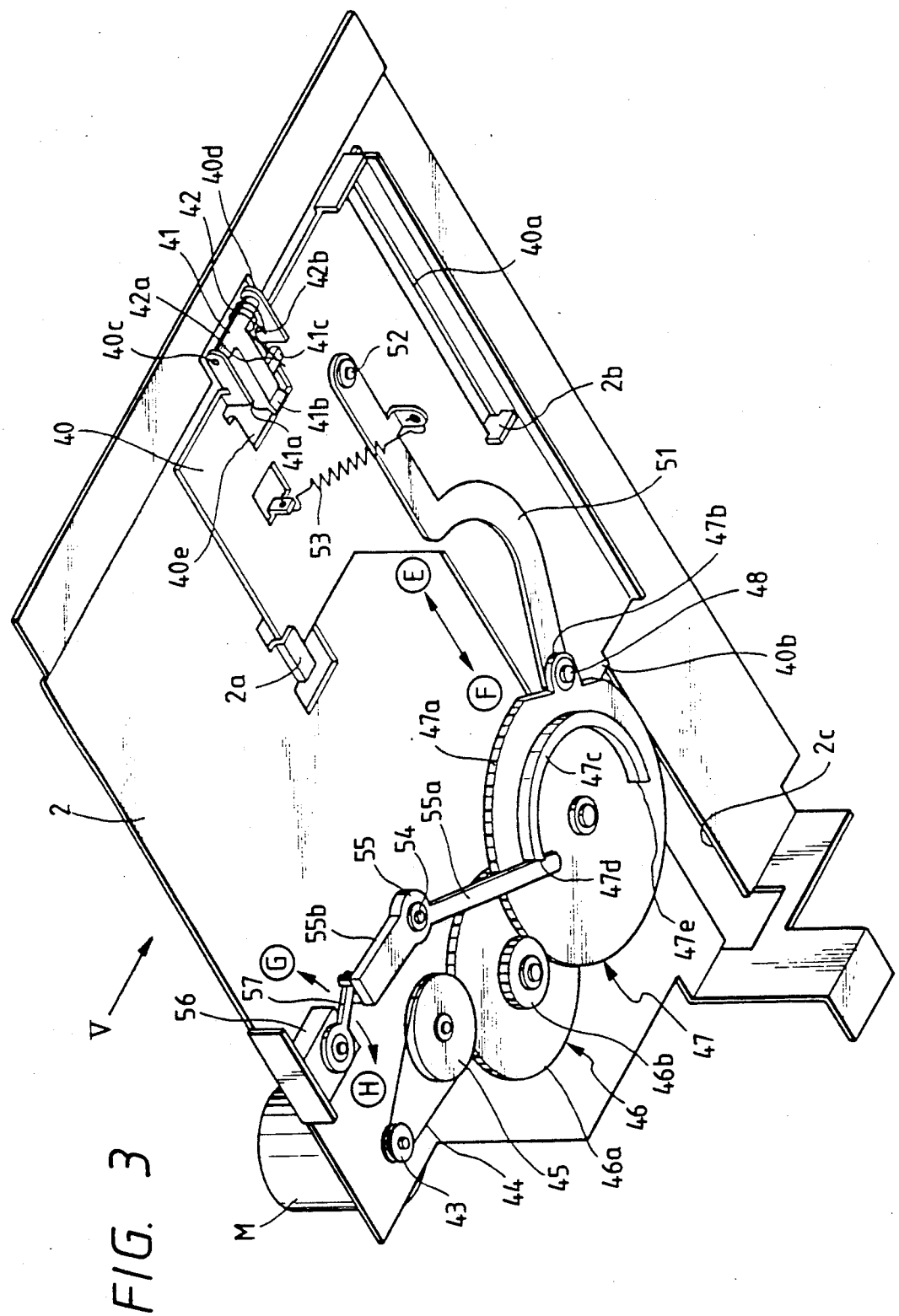
FIG. 3 is a perspective view of a cartridge table of the disk player of FIG. 1 as viewed from the bottom side.

Referring now to FIG. 3, a movable plate 40 is disposed on a lower face of the cartridge table 2. The movable plate 40 is arrested at a side edge thereof by a downwardly bent guide lug 2a formed on the cartridge table 2. A guide slot 40a is formed linearly in the other edge portion of the movable table 40, and another downwardly bent guide lug 2b formed on the cartridge table 2 is fitted in the guide slot 40a. The movable plate 40 is thus supported for movement in the directions indicated by a double-sided arrow mark Ⓕ-Ⓔ on the lower face of the cartridge table 2 under the guidance of the guide lugs 2a and 2b on the cartridge table 2.

A discharging member 40b is formed at a rear end of the movable plate 40 by laterally bending part of the movable plate 40. As shown in FIGS. 5A and 5B, the discharging member 40b extends through a cutout or opening 2c formed in the cartridge table 2 to and farther than the upper face of the cartridge table 2. The discharging member 40b is positioned in an opposing relationship to a leading end of a disk cartridge C in an insertion direction when the disk cartridge C is inserted into the cartridge table 2.

Figure 4:
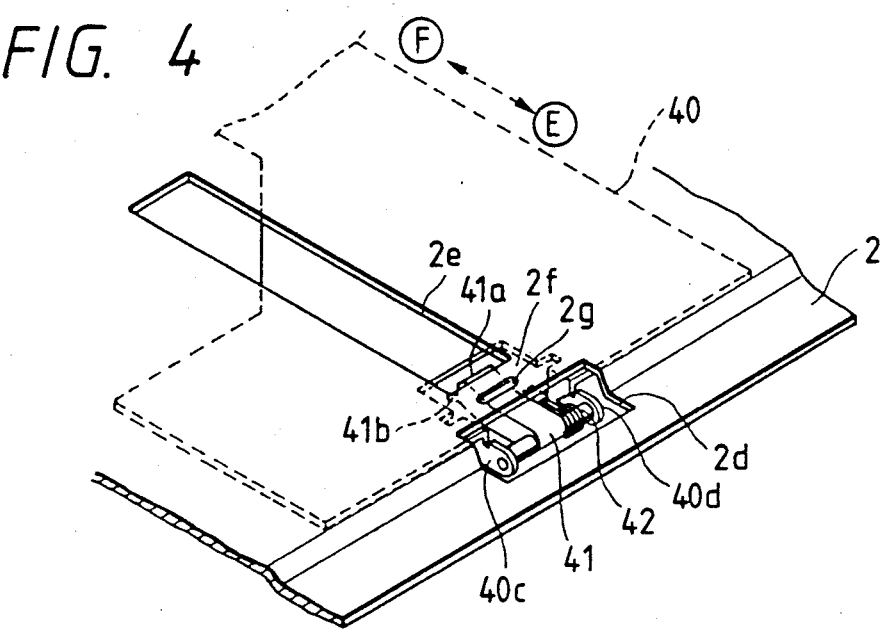
FIG. 4 is a partial perspective view of a front end portion of the cartridge table of FIG. 3 as viewed from the top side.

Referring to FIGS. 3 and 4, a pair of laterally bent brackets 40c and 40d are formed in an opposing relationship at the front end of the movable table 40. An opening 40e is defined between the brackets 40c and 40d. A drawing-in member 41 is supported for pivotal motion on and extends between the brackets 40c and 40d. The drawing-in member 41 is formed from a plastic material or the like and has an arresting portion 41a formed at an end of an arm thereof which extends from pivotally supported portions thereof while a stopper projection 41b is formed below the arresting portion 41a. Further, a projection 41c is formed at a side portion of the arm of the drawing-in member 41. A torsion coil spring 42 is fitted around one of the pivotally supported portions of the drawing-in member 41 and has an arm 42a anchored at the projection 41c of the drawing in member 41 and the other arm 42b anchored at the bracket 40d. Thus, the drawing-in member 41 is normally urged by the urging force of the torsion coil spring 42 to move the arresting portion 41a at the end of the arm thereof toward the surface of the cartridge table 2. As shown in FIG. 4, a cutout 2d is formed at a front end portion of the cartridge table 2 such that, when the movable member 40 is moved in the direction indicated by the arrow mark Ⓔ, the brackets 40c and 40d at the front end of the movable plate 40 and the pivotally supported portions of the drawing-in member 41 project a little from the cutout 2d. Meanwhile, a rectangular cutout 2e is formed in the cartridge table 2 at a location rearwardly of the cutout 2d. Then, an intermediate portion of the cartridge table 2 between the two cutouts 2d and 2e serves as a control face 2f. Meanwhile, a protrusion 2g is formed at a central portion of the control face 2f of the cartridge table 2 and is projected to the lower face side (toward the drawing-in member 41). Accordingly, when the movable plate 40 is moved to its limit position in the direction of the mark (E), the drawing-in member 41 is drawn in to a position below the control face 2f against the urging force of the torsion coil spring 42 and restrained downwardly by the projection 2g, and the arresting portion 41a of the drawing-in member 41 is retracted without being projected upwardly through the cutout 2e. When the movable plate 40 is moved in the direction of the mark (F) from the position shown in FIG. 4, the restraint by the control face 2f and the protrusion 2g is cancelled so that the arm portion of the drawing-in member 41 is pivoted upwardly by the urging force of the torsion coil spring 42 to project the arresting portion 41a of the drawing-in member 41 upwardly through the cutout 2e.

Subsequently, a driving mechanism for moving the movable member 40 in the directions of the marks (E)-(F) will be described.

Referring to FIG. 3, a motor M is mounted at a corner portion of the upper face of the cartridge table 2. A drive pulley 43 is mounted on a shaft of the motor M so that power of the motor M may be transmitted to a driven pulley 45 by way of a belt 44 extending between the pulleys 43 and 45. A gear (not shown) is formed in an integral relationship at a base portion of the driven pulley 45 adjacent the cartridge table 2 and is held in meshing engagement with a large diameter gear 46a of an intermediate gear member 46. The intermediate gear member 46 has another smaller diameter gear 46b which is held in meshing engagement with teeth 47a formed on a driving rotary member 47. Thus, the power of the motor M is transmitted to the driving rotary member 47 by way of the belt 44, driven pulley 45 and intermediate gear member 46.

A support projection 47b is formed on an outer periphery of the driving rotary member 47 and connected to an end of a driving lever 51 by means of a connecting pin 48. The other end of the driving lever 51 is connected to the movable plate 40 by way of a pin 52. When the driving rotary member 47 is driven to rotate in the clockwise direction in FIG. 3, the movable member 40 is moved in the direction of the arrow mark (F) by way of the driving lever 51, but when the driving rotary member 57 is driven to rotate reverse in the counterclockwise direction from the thus rotated position, the movable plate 40 is moved in the direction indicated by the arrow mark (E) by way of the driving lever 51.

An arcuate rib 47c is formed in an integral relationship on a lower face of the driving rotary member 47. Meanwhile, a detecting member 55 is supported for pivotal motion on the lower face of the cartridge table 2 by means of a pin 54. An arm 55a extends from the detecting member 55 to a position at which it can be engaged with either one of the opposite ends 47d and 47e of the arcuate rib 47 on the driving rotary member 47. Another arm 55b extends from the detecting member 55 and is held in engagement at an end thereof with an actuator 57 for a detection switch 56. The detection switch 56 is secured to the lower face of the cartridge table 2, and the actuator 57 is constructed such that it may be pivoted in the direction indicated by an arrow mark (G) or (H) to switch an electric circuit not shown. The actuator 57 is normally urged to a neutral position in the directions of the arrow marks (G) and (H) by a suitable means (not shown). The detection switch 56 may have, for example, such a switching construction that, when the actuator 57 is at its pivoted position in the direction of the arrow mark (G) or (H), it connects different contacts, but when the actuator 57 is at its neutral position, it disconnects the contacts.

A coil spring 53 extends between the driving lever 51 and the movable plate 40 so that it normally urges the driving lever 51 in the clockwise direction in FIG. 3. The coil spring 53 is provided to prevent inadvertent movement of the driving rotary member 47 when the driving rotary member 47 is not driven by the motor M and also to stabilize a detecting operation of the detection switch 56 in this condition. In particular, in the condition shown in FIG. 3, the end 47d of the arcuate rib 47c of the driving rotary member 47 engages with the arm 55a of the detecting member 55. In this condition, while power from the motor M is interrupted, since the driving lever 51 is urged in the clockwise direction by the coil spring 53, the driving rotary member 47 is retained at the position in a stabilized condition under the urging force of the coil spring 53 in the counterclockwise direction. Accordingly, the end 47d of the arcuate rib 47c of the driving rotary member 47 presses against the arm 55a of the detecting member 55 to urge the detecting member 55 to pivot in the clockwise direction to retain the actuator 57 of the detection switch 56 in a stabilized condition at the pivoted position in the direction indicated by the arrow mark (G). On the contrary when the driving rotary member 47 is rotated in the clockwise direction to its limit position to move the movable plate 40 in the direction indicated by the arrow mark (F) by way of the driving lever 51, the connecting pin 48 to the driving lever 51 is moved to a position symmetrical with its position shown in FIG. 3 with respect to the center of rotation of the driving rotary member 47 until the other end 47e of the arcuate rib 47c of the driving rotary member 47 is engaged with the arm 55a of the detecting member 55 to pivot the detecting member 55 in the clockwise direction to its limit position. Also in the position, the driving lever 51 which is urged in the clockwise direction by the coil spring 53 urges the driving rotary member 47 in the clockwise direction so that the driving rotary member 47 is retained in a stabilized condition at the position. Further, when the detecting member 55 is pivoted in the counterclockwise direction by the end 47e of the arcuate rib 47c, the actuator 57 of the detection switch 56 is pivoted to its limit position in the direction indicated by the arrow mark (H) by the arm 55b of the detecting member 55 and retained at the position in a stabilized condition under the urging force of the coil spring 53.

Subsequently, a structure of a disk cartridge to be mounted onto the cartridge mounting section D will be described with reference to FIGS. 6 and 7.

The disk cartridge C shown includes a plastic case 60 and a plurality of, 6 in the arrangement shown, disks DS accommodated in the plastic case 60. In FIG. 6, the disk cartridge C is viewed from a leading end side thereof when it is to be inserted into the cartridge mounting section D.

A plurality of partition plates 61 are inserted in the case 60 and partition the inside of the case 60 into a plurality of stages in each of which a disk DS is accommodated.

A pair of left and right leaf springs 62 are accommodated in the case 60 as shown in FIG. 7. Each of the leaf springs 62 has a substantially triangular shape in plan and is disposed such that it extends perpendicularly through the partition plates 61. The leaf springs 62 urge a disk DS in a different direction in accordance with a position of the disk DS in the case 60 with respect to the leaf springs 62. In particular, when the disk DS is in its fully inserted position in the case 60, the leaf springs 62 urge the disk DS in its insertion direction, that is, in the leftward direction in FIG. 7, but after the disk DS is moved in its opposite discharging direction, that is, in the rightward direction in FIG. 7, farther than the leaf springs 62, it is urged in the discharging direction by the leaf springs 62. A plurality of, 6 in the arrangement shown, ejectors 63 are provided in a column at an interior location of the case 60. The ejectors 63 are supported for individual pivotal motion on a pin 64 and disposed on the interior side of the stages of the case 60 and in an opposing relationship to rear ends of disks DS accommodated in the stages. As particularly seen in FIG. 7, each of the ejectors 63 has a pressed portion 63a formed on an outer face thereof and has a pressing portion 63b formed on an inner face thereof. When a disk discharging operation is to be performed, a discharging member 65 located rearwardly of the ejectors 63 is moved in the rightward direction in FIG. 7 by a driving means not shown to press against the pressed portion 63a of one of the ejectors 63 which opposes to the discharging member 65 then. Consequently, the ejector 63 is pivoted in the counterclockwise direction to press at the pressing portion 63b thereof against a rear end portion of the opposing disk DS to discharge the disk DS in the discharging direction toward the disk driving section F. Each of the ejectors 63 further has a laterally extending operating projection 63c formed on the outer face thereof. When, for example, a disk DS accommodated in the disk cartridge C is to be exchanged, an operator will push the operating projection 63c of a corresponding one of the ejectors 63 with a finger to pivot the ejector 63 in the clockwise direction in FIG. 7 to discharge the disk DS. However, since a plurality of, 6 in the arrangement shown, such ejectors 63 are disposed in a column in accordance with the number of disks to be accommodated in the case 60, it is a very difficult operation to pivot only one of the ejectors 63. Thus, in the arrangement shown, the operating projections 63c formed on the ejectors 63 extend alternately from different portions of ejectors 63 as seen in FIG. 6. In other words, two different types of ejectors which have operating projections 63c formed at two different positions are provided as the ejectors 63, and the ejectors of the two different types are mounted in an alternate relationship in a column. Consequently, the operating projections 63c of each pair of adjacent ones of the ejectors 63 are spaced from each other, which facilitates an operation of pushing one of the operating projections 63c.

Subsequently, the loading and discharging operations of a disk cartridge will be described.

A disk cartridge C is inserted into the cartridge mounting section D of the disk player shown in FIG. 1. In particular, the disk cartridge C is inserted in the direction indicated by the arrow mark (A) in FIG. 1 which coincides with the direction indicated by an arrow mark in FIG. 6.

When a disk cartridge C is inserted into the cartridge mounting section D, it is pressed against the cartridge table 2 by the pair of pressing rollers 3 mounted on the ceiling plate 1a of the body chassis 1 shown in FIG. 1. When the disk cartridge C is inserted in such condition, a leading end of the disk cartridge C is finally engaged with the discharging member 40b integral with the movable plate 40 as seen in FIG. 5A. If the disk cartridge C is further pushed in the same direction, then the movable plate 40 is pushed to move in the direction of the arrow mark (F) by way of the discharging member 40b. When the movable plate 40 is pushed to move in the direction of the arrow mark (F), the driving rotary member 47 is rotated in the clockwise direction in FIG. 3 by way of the driving lever 51 shown in FIG. 3. Thereupon, the end 47d of the arcuate rib 47c of the driving rotary member 47 is moved away from the arm 55a of the detecting member 55 to put the detecting member 55 into a free condition thereby to cancel the restraint of the actuator 57 by the other arm 55b of the detecting member 55. Consequently, the actuator 57 is returned to its neutral position by its own returning force. As a result of such returning of the actuator 57 to the neutral position, the contacts of the detection switch 57 are switched, for example, switched off. In response to such detection signal of the detection switch 57, a motor starting signal is developed to start the motor M. Consequently, the drive pulley 43 is driven to rotate in the clockwise direction. The driven pulley 45 is thus driven to rotate in the clockwise direction by the power of the drive pulley 43, and the power of the driven pulley 45 is transmitted to the driving rotary member 57 by way of the intermediate gear member 46 thereby to rotate the driving rotary member 47 in the clockwise direction. Thereupon, the movable plate 40 is drawn to move in the direction indicated by the arrow mark (F) by the driving rotary member 47 by way of the driving lever 51.

At a first stage during such movement of the movable plate 40 in the direction of the arrow mark (F), the drawing-in member 41 which has been restrained downwardly by the control face 2f and the protrusion 2g of the cartridge table 2 as shown in FIG. 4 untill then is moved out of the restrained condition. Consequently, the drawing-in member 41 is pivoted upwardly by the urging force of the torsion coil spring 42 to project the arresting portion 41a thereof upwardly through the cutout 2e of the cartridge table 2 shown in FIG. 4. Just then, a recessed portion 67 formed on a bottom wall of the disk cartridge C is at a position just above the drawing-in member 41 as shown in FIG. 5A. and the arresting portion 41a of the drawing-in member 41 which is projected upwardly by way of the cutout 2e of the cartridge table 2 is fitted into the recessed portion 67 of the disk cartridge C. Then, when the movable plate 40 is moved in the direction of the arrow mark (F) by the power of the motor M, the arresting portion 41a of the drawing-in member 41 is engaged with a stepped portion 67a at a leading end of the recessed portion 67 of the bottom wall of the disk cartridge C to draw in the disk cartridge C. Meanwhile, the stopper projection 41b provided on the drawing-in member 41 a little below the arresting portion 41a is engaged with the bottom wall of the disk cartridge C. Then, the disk cartridge C is fed in toward the interior of the cartridge mounting section D together with the movable plate 40 as seen in FIG. 5B.

When the movable plate 40 is moved to its limit position in the direction of the arrow mark (F), the driving rotary member 47 is rotated to its limit position in the clockwise direction in FIG. 3, whereupon the end 47e of the arcuate rib 47c thereof is engaged with the arm 55a of the detecting member 55 to pivot the detecting member 55 in the counterclockwise direction. Thereupon, the other arm 55b of the detecting member 55 pivots the actuator 57 in the direction of the arrow mark (H) so that the detection switch 56 detects completion of the mounting operation of the cartridge C.

A discharging operation of the cartridge may be performed, for example, in response to depression of an ejection operating button (not shown).

In response to depression of such ejection operating button, the motor M is started so that the drive pulley 43 is driven to rotate in the counterclockwise direction in FIG. 3. The driving rotary member 47 is thus rotated in the counterclockwise direction in FIG. 3 by the power of the drive pulley 43 so that the movable plate 40 is pushed to move out in the direction of the arrow mark (E) by way of the driving lever 51. Thereupon, the disk cartridge C is pushed out by the discharging member 40b formed on the movable plate 40. Meanwhile, since the arresting portion 41a of the drawing-in member 41 is fitted in the recessed portion 67 of the bottom wall of the cartridge C, some cartridge discharging force is provided to the disk cartridge C also from the drawing-in member 41. When the movable plate 40 is moved in the direction of the mark (E) by the power of the motor M to such position as shown in FIGS. 3 and 5A, the arm portion of the drawing-in member 41 is moved down to a position below the control face 2f of the cartridge table 2 as shown in FIG. 4 to retract the arresting portion 41a of the drawing-in member 41 downwardly from the cutout 2e of the cartridge table 2. Thereupon, the arresting portion 41a comes out of the recessed portion 67 of the bottom wall of the cartridge C. Consequently, the disk cartridge C can thereafter be pulled off from the player by hand.

Subsequently, a reproducing operation will be described.

When a desired one of the disks in the disk cartridge C is to be reproduced, searching of the disk to be reproduced is performed first. In the searching operation, the lifting screws 12 of the lifting mechanisms 10a to 10c are rotated in a synchronized relationship by the driving mechanism provided on the lower face of the bottom plate 1b of the body chassis 1. By such rotation of the lifting screws 12, the disk driving section F is moved upwardly or downwardly in the body chassis 1 together with the lift table 20. The rotation of the lifting screws 12 is stopped when the disk driving section F comes to a position in which it opposes to the desired one of the disks accommodated in the disk cartridge C. On the other hand, when a disk placed on the disk tray 6 is to be reproduced, the lift table 20 is moved down to its lowermost position at which the disk driving section F opposes sidewardly to the disk tray 6.

After such searching operation is completed, the discharging member 65 shown in FIG. 7 is driven to move in the rightward direction in FIG. 7 so that the desired one of the disks in the disk cartridge C or the disk on the disk tray 6 is pushed out from its position. Then, the desired disk or the disk and the disk tray 6 are supplied by means of rollers or the like not shown to the disk driving section F at which the desired disk or the disk on the disk tray 6 is clamped by the turntable and a clamper not shown and reproduced by means of the pickup.

Having now fully described the invention, it will be apparent to one of ordinary skill in the art that many changes and modifications can be made thereto without departing from the spirit and scope of the invention as set forth herein.

What is claimed is:

1. A cartridge guiding device for a disk player which includes a mounting section onto which a disk cartridge in which a plurality of disks are accommodated is to be mounted, and a disk driving section for driving a disk selectively taken out of a disk cartridge mounted on said mounting section, comprising a drawing-in member provided in mounting section such that said drawing-in member is driven by a motor to move toward the interior of said mounting section and is engaged, during such movement, with a stepped portion of a disk cartridge mounted on said mounting section to draw in the disk cartridge toward the interior of said mounting section, and a discharging member provided in said mounting section such that said discharging member is driven by said motor to move toward the outside of said mounting section and is engaged, during such movement, with part of a disk cartridge mounted on said mounting section to discharge the disk cartridge from said mounting section, wherein said mounting section has a cutout corresponding to a locus of movement of said drawing-in member and includes a restraining member provided thereon, and said drawing-in member is normally urged toward the interior of said mounting section by a spring such that, when a disk cartridge is mounted onto said mounting section, said drawing-in member is moved into said mounting section by way of said cut out of said mounting section by the urging force of said spring, but when no disk cartridge is mounted on said mounting section, said restraining member of said mounting section engages with said drawing-in member to restrain movement of said drawing in member by the urging force of said spring.

2. A cartridge guiding device according to claim 1, further comprising a movable member mounted on said mounting section for sliding movement toward the interior and reversely toward the outside of said mounting section, said discharging member being mounted on said movable member while said drawing-in member is mounted for pivotal motion on said movable member.

3. A cartridge guiding device according to claim 1, wherein said drawing-in member has an arresting portion for engaging with the stepped portion of a disk cartridge when the disk cartridge is to be drawn in toward the interior of said mounting section by said drawing-in member, and a projection for engaging with an outer periphery of a disk cartridge when the disk cartridge is to be drawn in toward the inside of said mounting section.

4. A cartridge guiding device according to claim 1, wherein said discharging member operates a driving switch for said motor when a disk cartridge is mounted onto said mounting section, but when the disk cartridge is to be pushed toward the outside of said mounting section, said discharging member pushes a trailing end of the disk cartridge in the discharging direction.

* * * * *